US008752165B2

(12) United States Patent
Hauck et al.

(10) Patent No.: US 8,752,165 B2
(45) Date of Patent: Jun. 10, 2014

(54) PROVISIONING SECRETS IN AN UNSECURED ENVIRONMENT

(75) Inventors: Jerry Hauck, Windermere, FL (US); Michael Lambertus Hubertus Brouwer, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1433 days.

(21) Appl. No.: 12/202,203

(22) Filed: Aug. 29, 2008

(65) Prior Publication Data

US 2009/0300758 A1 Dec. 3, 2009

Related U.S. Application Data

(60) Provisional application No. 61/057,174, filed on May 29, 2008.

(51) Int. Cl.
*H04L 9/00* (2006.01)

(52) U.S. Cl.
USPC .......................................................... 726/21

(58) Field of Classification Search
USPC .............................. 726/21; 380/283; 455/410
See application file for complete search history.

(56) References Cited

U.S. PATENT DOCUMENTS

| 6,272,208 | B1* | 8/2001 | Kasrai .................... 379/15.03 |
| 7,111,053 | B1* | 9/2006 | Black et al. ................... 709/220 |
| 2004/0059937 | A1* | 3/2004 | Nakano .......................... 713/200 |
| 2006/0165227 | A1* | 7/2006 | Steeb et al. .............. 379/201.03 |
| 2006/0174018 | A1* | 8/2006 | Zhu et al. ....................... 709/229 |
| 2008/0183623 | A1* | 7/2008 | Xu et al. .......................... 705/51 |
| 2008/0225805 | A1* | 9/2008 | Pearson et al. ................ 370/338 |
| 2008/0319908 | A1* | 12/2008 | Venkatachalam et al. ...... 705/50 |
| 2009/0158032 | A1* | 6/2009 | Costa et al. .................... 713/156 |

* cited by examiner

*Primary Examiner* — Matthew Smithers
(74) *Attorney, Agent, or Firm* — Womble Carlyle Sandridge & Rice LLP

(57) ABSTRACT

A method and apparatus for generating provisioning data to provision a device are described. A provisioning bundle is validated according to a relationship between a configuration and a bundle sequence number identifying the provisioning bundle. A provisioning request includes a device hardware identifier identifying the device. An authorization for the provisioning request is determined for generating provisioning data including the provisioning bundle personalized by the device hardware identifier for the device.

24 Claims, 12 Drawing Sheets

500a

In response to receiving an authorization request including a maximum sequence number for provisioning operations from a provisioning engine, validating cryptographically the authorization request according to an authorization key uniquely associated with the provisioning engine 501

Determining a number of provisioning operations authorized for the provisioning engine to perform according to the maximum sequence number 503

For a predetermined period of time, continuing sending (e.g. for each fixed interval) an authorization message including the number of authorized provisioning provisioning operations to the provisioning engine until at least a successful reply to the authorization message has been received 505

Generating a batch of provisioning bundles uniquely encrypted for a provisioning engine, the batch including provisioning bundles associated with monotonically (e.g. consecutively) increasing provisioning bundle sequence numbers 507

Sending the batch of provisional bundles to the provisioning engine associated with an identity key 509

In response to receiving a provisioning receipt from a provisioning engine, validating cryptographically the provisioning receipt based on the identity key associated with the provisioning engine 511

Retrieving from the provisioning receipt a provisioning bundle sequence identifier, a device serial number and personalized provisioning data (e.g. unlock codes) to store in one or more secure database 513

Fig. 5B

PROVISIONING SECRETS IN AN UNSECURED ENVIRONMENT

CROSS-REFERENCE TO RELATED APPLICATIONS

This application is related to, and claims the benefits of U.S. Provisional Patent Application No. 61/057,174, filed on May 29, 2008 entitled "Methods For Securely Provisioning Secrets Or Data Into Manufactured Systems", Jerry Hauck et al. which Tre hereby incorporated by reference herein in its entirety.

FIELD OF INVENTION

The present invention relates generally to electronic security. More particularly, this invention relates to provisioning secrets into a device in an unsecured environment.

BACKGROUND

Provisioning of a device, such as a cell phone handset for a carrier, often involves passing per device secret data. Hence, a secured and trusted manufacturing process is required for performing provisioning operations. Usually, the cost to guarantee security and trust is relatively low in a centralized and tightly integrated local manufacturing environment. However, as more and more hardware manufacture factories are diversely located geographically and distributed all over the globe, the cost of physically guaranteeing secured and trusted manufacturing environments has become too high to be practically plausible.

Although advancements in networking technologies have enabled secure remote transactions to support device provisioning process, the quality of networks, however, is usually not guaranteed. Often times, network connectivity may be dropped in an unpredictable and unexpected manner. This is especially true for a wide area network covering distant remote locations supported by network infrastructures of varied qualities, on top of unavoidable natural disasters and interferences. As a result, loss of network connections has become a norm instead of an exception. However, critical time to market may be lost while waiting for a recovery of network connections to complete device provisioning.

Therefore, current device provisioning process does not support insecure and untrusted remote manufacturing environments connected over intermittent networks.

SUMMARY OF THE DESCRIPTION

A method and apparatus for generating provisioning data to provision a device are described herein. A provisioning bundle is validated according to a relationship between a configuration and a bundle sequence number identifying the provisioning bundle. A provisioning request includes a device hardware identifier identifying the device. An authorization for the provisioning request is determined for generating provisioning data including the provisioning bundle personalized by the device hardware identifier for the device.

In an alternative embodiment, an authorized number of provisioning operations is determined in response to receiving an authorization request including a maximum sequence number from a provisioning engine. The authorization request is validated cryptographically according to an identity key uniquely associated with the provisioning engine. The number of provisioning operations authorized is based on the maximum sequence number received. An authorization packet including the authorized number of provisioning operations cryptographically signed according to an authorization key is sent do the provisioning engine.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which:

FIGS. 5A and 5B are flow diagrams illustrating embodiments of processes to support provisioning devices;

DETAILED DESCRIPTION

Figure 1:
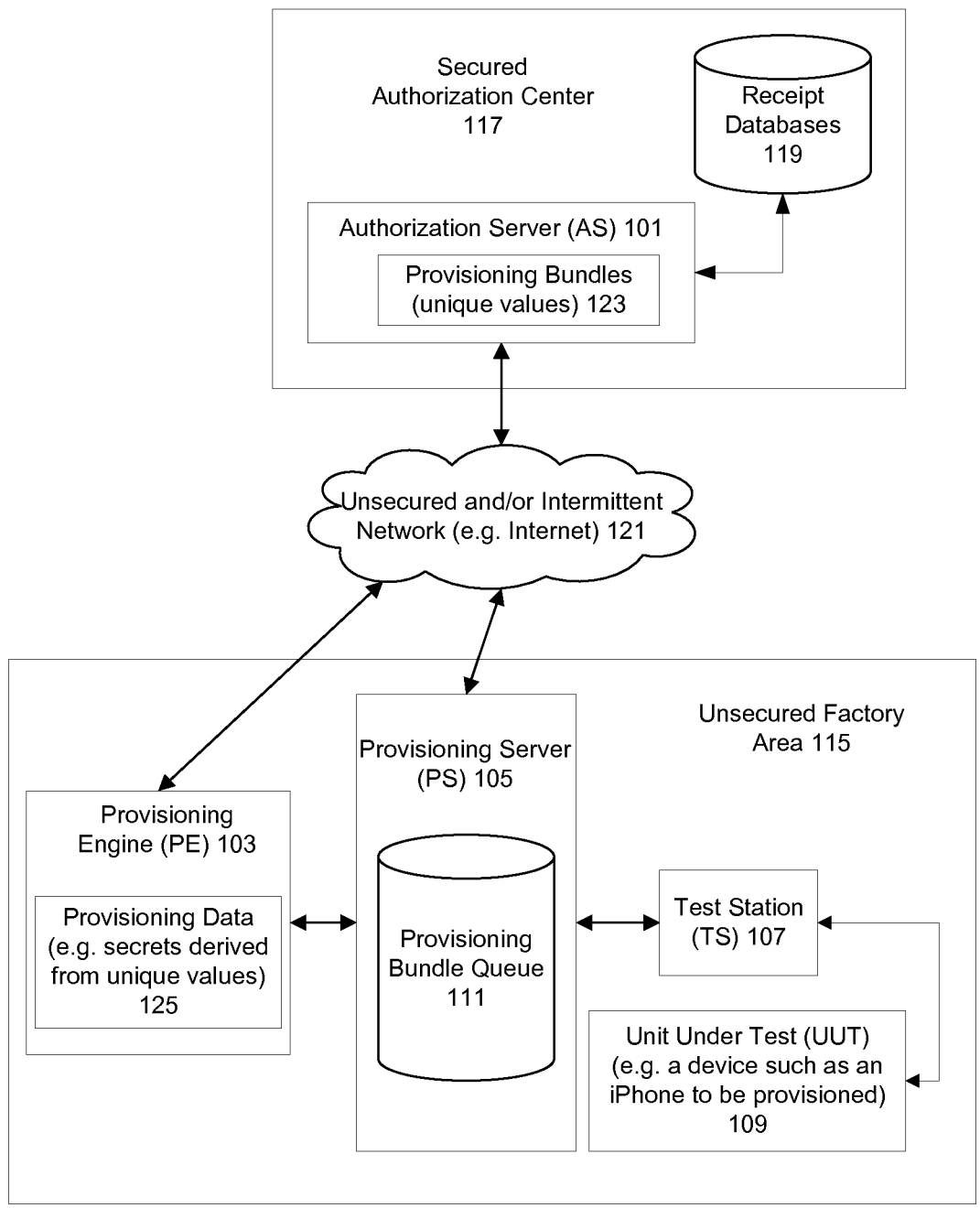
FIG. 1 is a block diagram illustrating one embodiment of network configurations for provisioning a device in an unsecured environment.

A method and an apparatus for provisioning secrets into a device in an unsecured environment are described herein. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The term "host" and the term "device" are intended to refer generally to data processing systems rather than specifically to a particular form factor for the host versus a form factor for the device.

According to certain embodiments, a mobile device or handset to be deployed may include certain secrets or data that uniquely represents certain characteristics of the device. Within their non-volatile storage areas, mobile handsets may incorporate personalization and customization data, which include fields that are required to be either immutable or secret. Examples include the immutable IMEI (International Mobile Equipment Identifier) and SIM (Subscriber Identity Module) Lock definitions or the secret SIM Lock unlock codes. Provisioning then, by way of general definition, may be a secure and trusted manufacturing process that generates, introduces, and logs authentic personalization and customization data for, or into, each authentic handset.

Personalization data may be generated by selecting a unique IMEI for a handset (from a range of pre-assigned numbers) and producing the requisite number of secrets. Many of the secrets may be intended to be per-unit secrets (e.g. the SIM Lock unlock codes) and can be generated randomly (preferred for security) or derived cryptographically from a known unique value such as the IMEI or device serial number.

Customization data may include SIM Lock behavior definitions provided by the telecommunication carrier and which normally apply to all handsets produced to satisfy a given carrier order. The personalization and customization data may be combined into single SEC data structure for delivery to the handset. In one embodiment, the SEC data structure is stored in the onboard FLASH in the handset and is protected against unauthorized software modification via the encryption, authentication, and/or validation services of the security module running within the secure boot core. Alone, the secure boot core can afford no protection against the class of FLASH replacement or hardware reprogramming attacks since it resides in the FLASH and could be replaced or modified as part of the attack. Protection against such hardware attacks may require additional physical security (e.g., integration of the FLASH component into the broadband processor or epoxy) or the cooperation of the baseband processor's onboard ROM to cryptographically validate the secure boot core image prior to launch (effectively rooting the software the chain of trust within a physically resistant boundary).

Many of the unlock codes personalized for a given device may be retained for use by a factory for rework, by customer service centers for repair or troubleshooting, and by carriers to implement SIM lock removal policies. In support of these uses, one or more secure databases may be built as phones are provisioned such that the required unlock codes can be retrieved (for example, by matching on the IMEI of the handset) for an authorized use.

According to one embodiment, provisioning of a new mobile device includes, but is not limited to:

Selection of a unique IMEI

Secure generation/selection of unit unlock codes

Selection of customization data (SIM Lock behavior)

Secure generation of the combined target SEC Data Structure

Delivery of the SEC Data Structure to the mobile device

Secure logging of select unit unlock codes to one or more secure databases.

FIG. 1 is a block diagram illustrating one embodiment of network configurations for provisioning a device (e.g. a handset) in an unsecured environment. Configuration 100 may include an authorization server 101 operating in a secured area (e.g. an authorization center) 117 maintaining provisioning bundles 123 to be provisioned into a device 109 located in an unsecured area 115, such as a remote factory. A provisioning bundle 123 may be a data structure allocated with unique values to derive per unit secrets for provisioning a device. A provisioning bundle 123 may include raw information required to personalize and customize a device during provisioning. Raw information in a provisioning bundle may include, for example, a unique IMEI number, two unique MAC (Media Access Control)-48 addresses, three system unlock codes, a variable number of active SIM unlock codes and carrier specified SIM lock behavior definitions applicable for a certain release of device firmware, etc. Each IMEI number may uniquely identify a single device system installed in a device. Additionally, a provisioning bundle may include a unique bundle sequence number. An authorization server 101 may be loosely coupled with a device 109 via an unsecured network 121 in which network connections may be intermittent without a guarantee for reliability and/or trustworthiness. An unsecured network 121 may be the Internet.

In one embodiment, provisioning a device includes generation of provisioning data 125 including personalization and customization data such as an IMEI number, a SIM Lock behavior definition provided by a network carrier and/or SIM Lock unlock codes. A provisioning data may be a secret generated randomly or derived cryptographically from unique values such as IMEI numbers 123 and/or device serial numbers.

A test station 107 may be a server system which is capable of detecting when a test unit 109, such as a device to be provisioned, is being attached to initiate a provisioning request to a provisioning server 105. Accordingly, a provisioning server 105 may retrieve a provisioning bundle from a provisioning bundle queue 111 storing provisioning bundles received from an authentication server 101, such as provisioning bundles 123. In one embodiment, provisioning bundles in a provisioning bundle queue may be associated with a common profile identified by a profile identifier. The number of active SIM unlock codes and associated behavior definitions may differ across multiple carriers and product configurations as separate profiles.

In one embodiment, a provisioning engine 103 may generate provisioning data 125 personalized for a device 109 from a provisioning bundle retrieved via a provisioning server 105 to provision the device 109. Additionally, a provision engine 103 may produce a receipt including secrets generated for a provisioning data 125 (e.g. a SNIM Lock code) associated with unique values 123 (e.g. a device system identifier) used during provisioning a device 109. A provisioning server 105 may send a receipt received from a provisioning engine 103 to an authentication server 101 to store in one or more receipt databases 119 in a secured area 117.

In one embodiment, a provisioning engine 103, a provisioning server 105, test station 107 and a device 109 may be coupled via a local area network. In some embodiments, a provisioning engine 103 and a provisioning server 105 may belong to a single server. A plurality of servers may provide a farm for hosting multiple provisioning engines and provisioning servers including a provisioning engine 103 and a provisioning server 105 mated with a one to one relationship.

Figure 2:
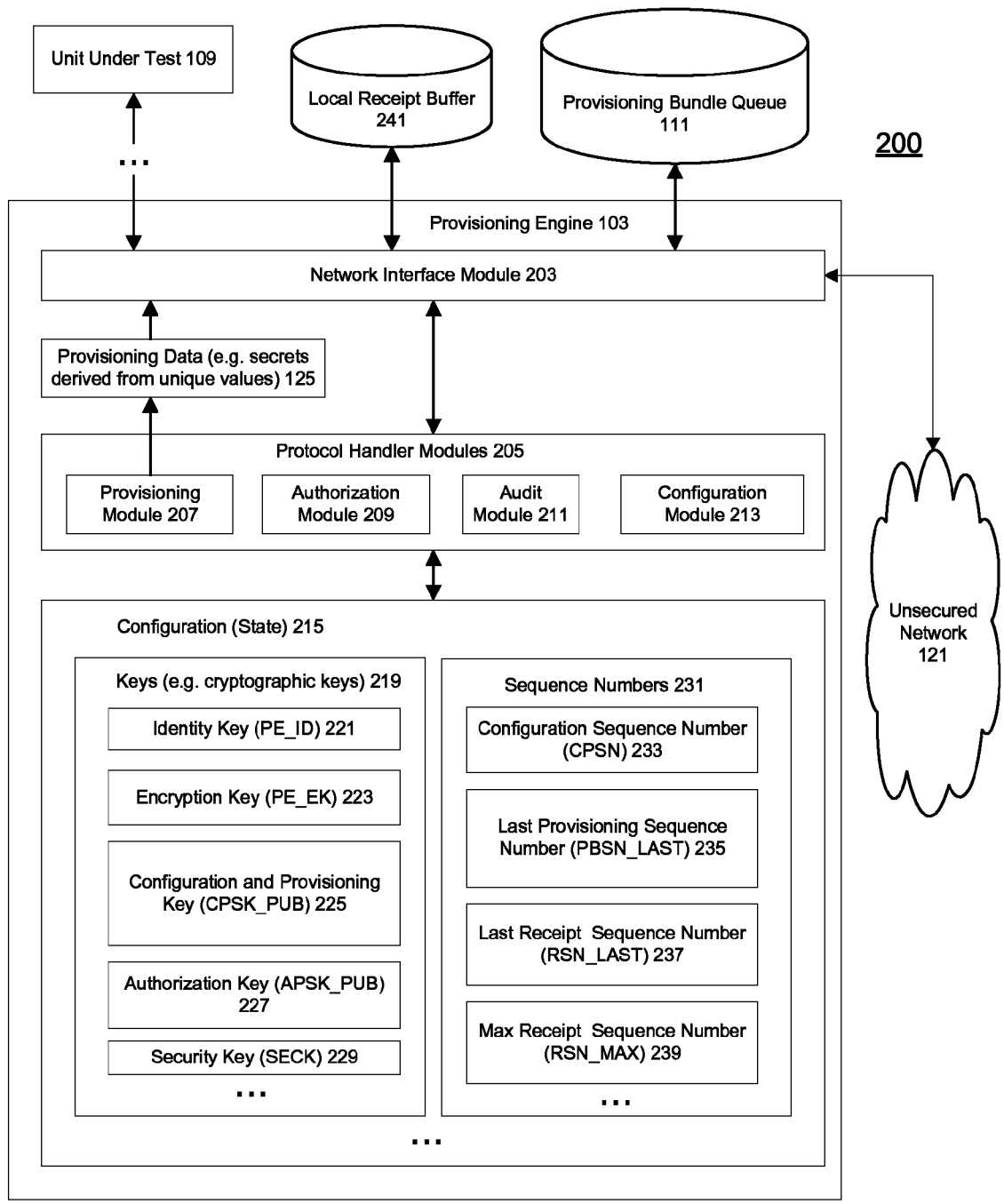
FIG. 2 is a block diagram illustrating one embodiment of system components to provision a device.

FIG. 2 is a block diagram illustrating one embodiment of system components to provision a device. System 200 may include a provisioning engine 103 of FIG. 1. In one embodiment, a provisioning engine 103 stores a configuration 215 representing a state for performing provisioning operations. States may differ at different points in time. In one embodiment, a configuration 215 includes a set of keys 219 and a set of sequence numbers 231. Each of the sequence numbers 231 may be updated monotonically increasing in value. In one embodiment, each of the set of sequence numbers 231 is prohibited from being updated with values no greater than its original value.

A key may be used for cryptographic operations such as encryption, decryption, and/or signature signing (hashing) for authentication and verification. A key may be a symmetric key or an asymmetric key such as one of a public key or a private key in a public-private key pair. For example, an identity key (PE_ID) 221 may be a private key uniquely associated with a provisioning engine 103 for signing a hash signature. An encryption key (PE_EK) 223 may be another private key to decrypt messages intended specifically for the provisioning engine 103. A configuration and provisioning key (CPSK_PUB) 225 may be a public key for signature verification on configuration and/or provisioning messages received. An authorization key (APSK_PUB) 227 may be a public key for signature verification on authorization messages received. A security key (SECK) 229 may be a private key for encrypting and signing provisioning data for a device.

Protocol handler modules 205 may include one or more modules to perform cryptographic operations to support secured provisioning operations based on keys 219 and/or sequence numbers 231 retrieved from a configuration 215. Each protocol handler module may update a separate sequence number to ensure a security of provisioning operations performed by a provisioning engine. For example, a provisioning module 207 may generate provisioning data 125 using SECK key 229 and update a last provisioning sequence number (PBSN_LAST) 235. An authorization module 209 may authenticate an authorization message to update a max receipt sequence number (RSN_MAX) 239. An audit module may generate a receipt including a last provisioning sequence number (PBSN_LAST) 235 cryptically signed according to an identity key (PE_ID) 221. Alternatively, a configuration module 213 may update a configuration 215 including a configuration sequence number 233 according to a configuration message authenticated via a configuration and provisioning key (CPSK_PUB) 225. In certain embodiments, an authorization module 209 sends heart beat messages to an authorization server periodically to receive enabling messages. An authorization module 209 may keep track of a date/time stamp of last enabling message received to measure a time out value. If a time out value exceeds a configured time out value, a provisioning engine 103 may be disabled (e.g. due to loss of network connections with an authorization server).

In one embodiment, a provisioning bundle queue (e.g. a database) 111 and a local receipt buffer 241 (e.g. a database) may be locally coupled to a provisioning engine 103 via a network interface module 203. A unit under test 109 (e.g. a device) to be provisioned may be coupled directly or indirectly to a provisioning engine 103. A provisioning bundle queue 111 stores a batch of pre-allocated provisioning bundles received remotely via an unsecured network 121 to be consumed by a provisioning engine 103. In one embodiment, a local receipt buffer 241 stores provisioning receipts generated by a provisioning engine 103.

Figure 3:
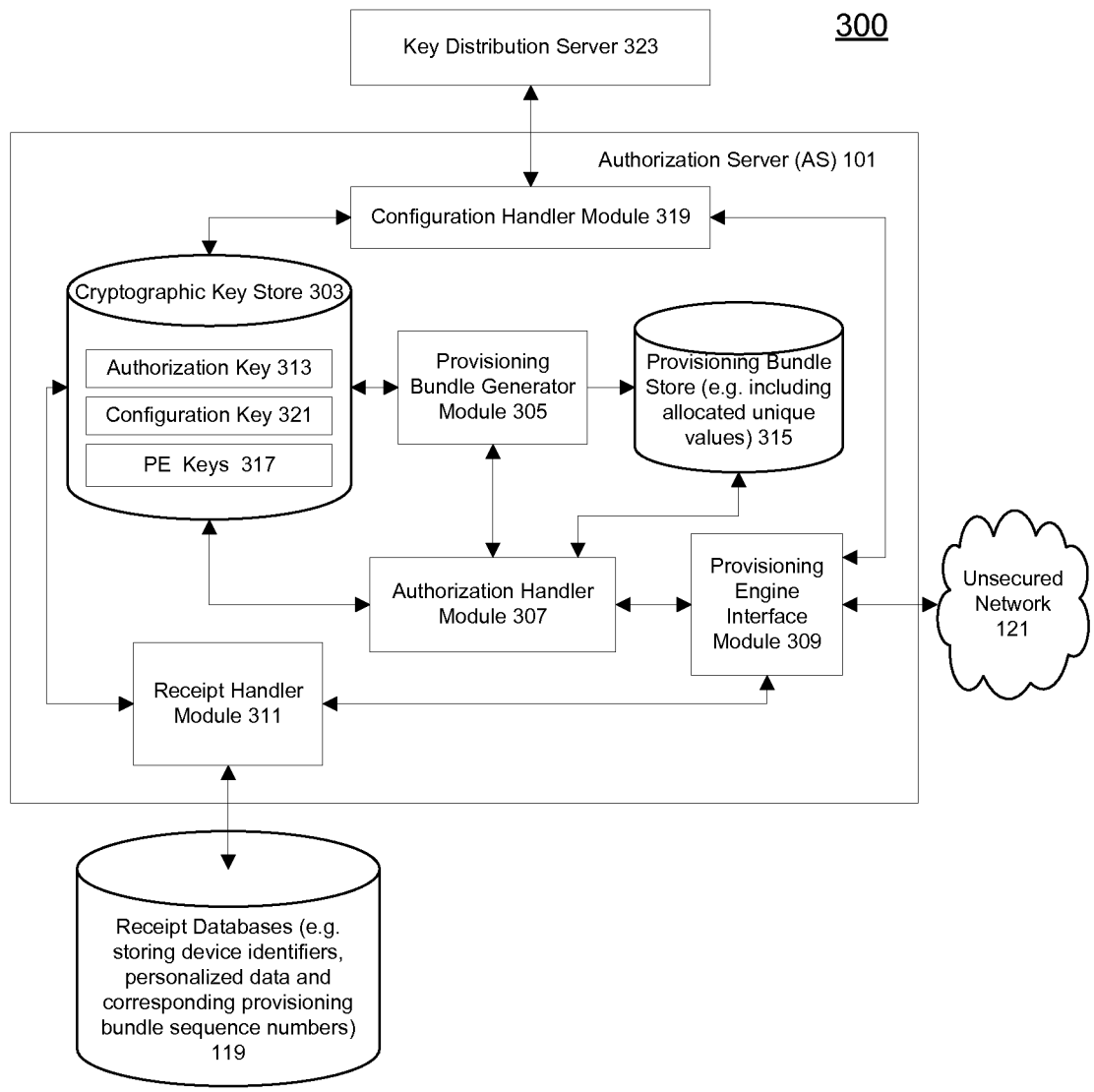
FIG. 3 is a block diagram illustrating one embodiment of system components to authorize provisioning operations.

FIG. 3 is a block diagram illustrating one embodiment of system components to authorize provisioning operations. In one embodiment, system 300 includes an authorization server 101 of FIG. 1 securely coupled to one or more databases, such as secure databases 119 of FIG. 1. A provisioning engine interface module 309 may communicate messages between an authorization server 101 and a provisioning engine, such as provisioning engine 103 of FIG. 1, via an intermittent and unsecured network 121. In one embodiment, a provisioning engine interface module 309 may be capable of sending multiple copies of messages over a predetermined period of time to increase a rate of success for the messages to reach a remote provisioning engine. When receiving a message from a provisioning engine, a provisioning engine interface module 309 may forward the received message to one of a plurality of modules including an authorization handler module 307 and a receipt handler module 311 according to identifiers included in the received message. In certain embodiments, a provisioning engine interface module 309 sends enabling messages to keep a provisioning engine enabled in response to heart beat messages from the provisioning engine.

In one embodiment, an authorization handler module 307 determines a maximum number of provisioning operations allowed for a provisioning engine in response to an authorization request received. An authorization request may be cryptographically signed using an identity key associated with a provisioning engine, such as PE_ID 221 of FIG. 2. Each provisioning operation in a provisioning engine may provision a single device. In one embodiment, a provisioning engine is prohibited from provisioning a device after performing the maximum number of provisioning operations allowed for an authorization request. An authorization handler module 307 may activate a provisioning bundler generator 305 to generate multiple provisioning bundles including allocated unique values, such as IMEI numbers to provision devices. In one embodiment, a provisioning bundle is generated in association with a particular provisioning engine and/or a profile of product configurations. A provisioning bundle may include a signature signed according to a configuration key 321. A provisioning bundle store 315 may store generated provisioning bundles for multiple provisioning engines. In some embodiments, a provisioning bundle store 315 is a separate database locally coupled to an authorization server 101. An authorization handler module 311 may retrieve a series of provisioning bundles having consecutive provisioning bundle sequence numbers to forward to a provisioning engine associated with the series of provisioning bundles.

A configuration handler module 319 may determine a new configuration setting (e.g. including a replacement set of cryptographic keys and a configuration sequence number etc.) for a provisioning engine. In one embodiment, a new configuration setting is associated with an additional product line to enable a provisioning engine to provision multiple categories of products (e.g. handsets for different carriers, personal computers etc.) A configuration handler module 319 may compose a configuration packet including a configuration setting to instruct a provisioning engine to update (in part or completely) a configuration according to the configuration setting. In one embodiment, a configuration handler module 319 retrieves cryptographic keys for a configuration setting from a key distribution server 323 securely coupled to an authorization server 101. A configuration server may host a configuration handler module separately from an authorization server.

A cryptographic key store 303 may include an authorization key 313 uniquely associated with an authorization server 101. An authorization key 313 may be a private key paired with a public key distributed to provisioning engines, such as APSK_PUB 227 of FIG. 2. Each of PE keys 317 may correspond uniquely to a single provisioning engine. A PE key 317 may be a public key paired with a private key stored in a provisioning engine, such as PE_ID 221 or PE_EK 223 of FIG. 2. A provisioning bundle generator module 305 may encrypt a provisioning bundle with a PE key of PE Keys 317 to associate the generated provisioning bundle with a provisioning engine corresponding to the PE key. In one embodiment, an authorization handler authenticates an authorization message with a provisioning engine according to an authorization key 313. A configuration handler module 319 may sign a configuration packet according to a configuration key 321 retrieved from a cryptographic key store 303. In one embodiment, a configuration key 321 may be a private key paired with a public key such as CPSK_PUB 225 of FIG. 2. In one embodiment, a configuration handler module 319 makes use of public keys, such as PE Keys 317, to perform encryptions.

One or more receipt databases 119 may securely coupled with an authorization server 101 (e.g. located in the same secure area) to store provisioning receipts included in receipt messages received from provisioning engines. A receipt database 119 may include associations between secret provisioning data embedded in receipt messages and corresponding provisioned devices, e.g. based on unique device hardware identifiers. In one embodiment, a receipt database 119 includes provisional bundle sequence numbers to associate a provisioned device with a provisional bundle in a provisional bundle store 315. A receipt handler module 311 may authenticate a receipt message received from a provisioning engine according to PE keys 317, such as public keys paired with PE_ID 221 of FIG. 2, corresponding to the provisioning engine. In another embodiment, a receipt handler module 311 decrypts a receipt message using a private authorization key, such as authorization key 313.

Figure 4A:
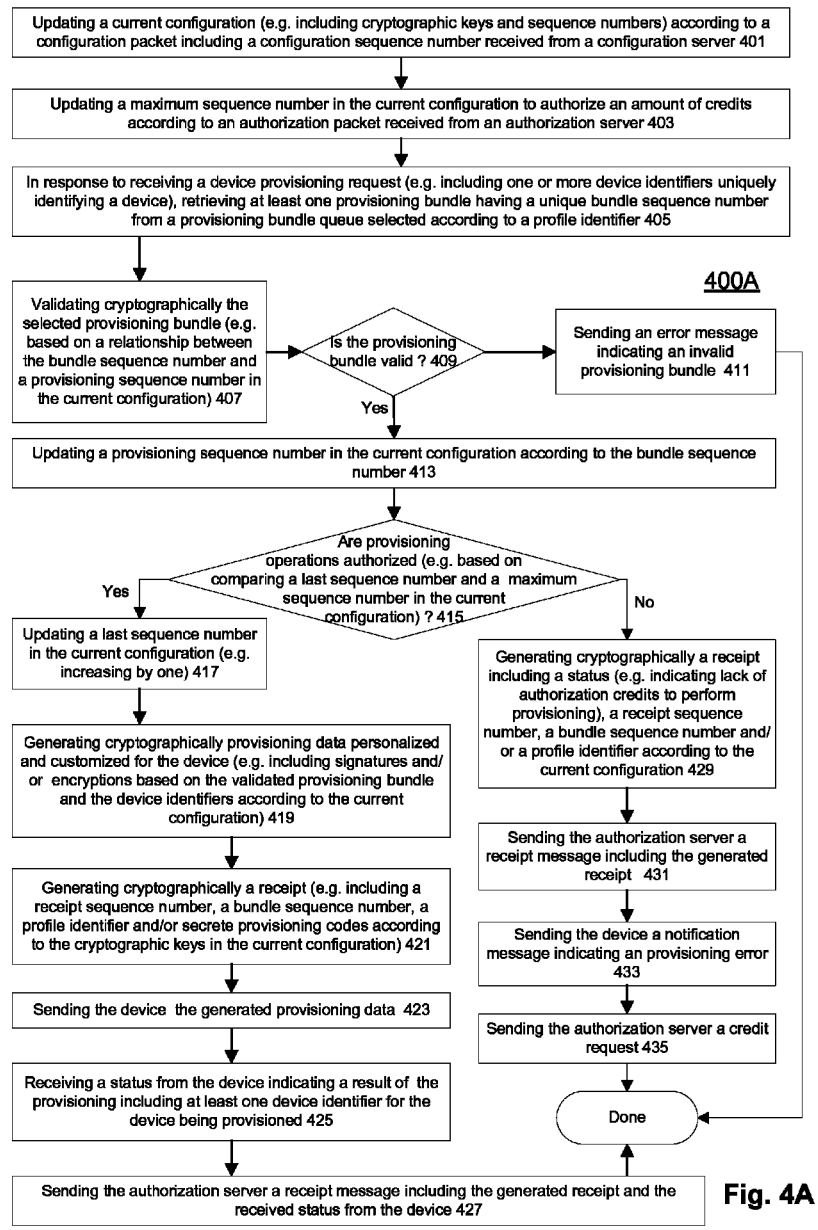
FIGS. 4A and 4B are flow diagrams illustrating embodiments of a process to provision secretes into a device.

FIG. 4A is a flow diagram illustrating one embodiment of a process to provision secretes into a device. Exemplary process 400A may be performed by a processing logic that may include hardware (circuitry, dedicated logic, etc.), software (such as is run on a dedicated machine), or a combination of both, For example, process 400A may be performed by system 200 of FIG. 2. At block 401, according to one embodiment, the processing logic of process 400A may update a current configuration, such as configuration 215 of FIG. 2, in response to a configuration packet received from a configuration server, such as server 101 (an authorization server also acting as a configuration server) of FIG. 3. A configuration packet may include one or more cryptographic keys and/or one or more sequence numbers. In one embodiment, a current configuration, such as configuration 215 of FIG. 2, is replaced with a new configuration storing values (e.g. cryptographic keys and sequence numbers) according to a configuration packet.

A new configuration may replace a current configuration with a different set of keys and/or updating key values to determine which categories of devices a provisioning engine is allowed to provision. Alternatively, the processing logic of process 400A may compare a sequence number, such as PBSN_LAST 235 of FIG. 2, in a current configuration with a corresponding one in a received configuration packet to determine a value for the sequence number in a new configuration. In one embodiment, a new configuration replaces a portion of a current configuration. For example, a security key, such as SECK 229 of FIG. 2, is updated according to a configuration packet while an encryption key, such as PE_EK 223 of FIG. 2, a configuration/provisioning key, such as CPSK_PUB 225 of FIG. 2, and an authorization key, such as APSK_PUB 227 of FIG. 2, are kept intact.

In some embodiments, a sequence number in a new configuration may be required to be greater than a corresponding sequence number in a current configuration. For example, if a current configuration includes a configuration sequence number 10001 a new configuration may include a configuration sequence number 10002 but not 10001 or less. The processing logic of process 400A may determine whether to update a configuration by comparing a configuration sequence number, such as CPSN 233, of the configuration with a corresponding value in a received configuration packet. In some embodiments, a configuration packet is allowed to update a current configuration if a configuration sequence number included in the configuration packet is greater than a current configuration sequence number stored in the current configuration. The processing logic of process 400A may authenticate a received configuration packet based on a configuration key, such as CPSK_PUB 225 of FIG. 2, according to a public key cryptographic algorithm, such as RSA1 (Ron Rivest, Adi Shamir and Leonard Adleman version 1).

At block 403, according to one embodiment, the processing logic of process 400A updates a maximum sequence number, such as RSN_MAX 239 of FIG. 2, in a current configuration, such as configuration 215 of FIG. 2, according to an authorization packet received from an authorization server, such as authorization server 101 of FIG. 1. An authorization packet may authorize an amount of credits to a provisioning engine by increasing the maximum number of receipts that a provisioning engine is allowed to generate. The processing logic of process 400A may update a maximum receipt sequence number in a current configuration if a corresponding value in an authorization packet is greater than the current maximum receipt sequence number. In one embodiment, the processing logic of process 400A authenticates a received authorization packet based on an authorization key, such as APSK_PUB 227 of FIG. 2, according to a public key cryptographic algorithm.

In response to receiving a device provisioning request, the processing logic of process 400A may select at least one provisioning bundle to provision a device at block 405. A device provisioning request may include a profile identifier for a product configuration with a carrier. For example, a cell phone handset device and a desktop computer device may be associated with different profiles. A device provisioning request may include one or more hardware identifiers for a device to be provisioned. A hardware identifier may be a serial number for a chip, a board or other hardware parts manufactured into a device. Each hardware identifier may uniquely identify a single device. In one embodiment, a device provisioning request includes a profile identifier associated with a product configuration for a carrier. A profile identifier may specify a category of products associated with a device to be provisioned, such as a cell phone handset or a desktop computer. In one embodiment, the processing logic of process 400A selects a provisioning bundle queue, such as provisioning bundle queue 111 of FIG. 2, according to a profile identifier to retrieve at least one provisioning bundle. Each provisioning bundle queue may be associated with a profile identified by a profile identifier.

A provisioning bundle queue may store multiple provisioning bundles in an order according to associated bundle sequence numbers, such as, for example, monotonically increasing from the top of the bundle queue. Consecutive bundle sequence numbers may be associated with adjacent provisioning bundles in a provisioning queue. In one embodiment, the processing logic of process 400A retrieves provisioning bundles from the top of a provisioning queue for provisioning a device. If a provisioning queue is empty, the processing logic of process 400A may send a message to an authorization server or other servers reporting a status indicating a need for additional provisioning bundles. The processing logic of process 400A may respond an error (e.g. to a router routing the provisioning request) to provision a device if no required provisioning bundles are available from a provisioning queue.

At block 407, in one embodiment, the processing logic of process 400A validates a provisioning bundle (e.g. retrieved from a provisioning queue) for provisioning a device. The processing logic of process 400A may compare a bundle sequence number associated with a provisioning bundle and a last provisioning sequence number in a configuration, such as PBSN_LAST 235 of FIG. 2. In one embodiment, a provisioning bundle is not valid if an associated bundle sequence number is no greater than a last provisioning sequence number.

In one embodiment, a provisioning bundle is valid for a single provisioning engine. The processing logic of process 400A may decrypt a retrieved provisioning bundle based on an encryption key, such as PE_EK 223 of FIG. 2 according to a public key cryptographic algorithm. Additionally, the processing logic of process 400A authenticates a provisioning bundle having a signature based on a provisioning key, such as CPSK_PUB 225 of FIG. 2, according to a public key cryptographic algorithm. The processing logic of process 400A may validate a provisioning bundle based on successful authentication, decryption and comparison on an associated bundle sequence number.

At block 409, if a provisioning bundle is not validated, the processing logic of process 400A may send an error message indicating an invalid provisioning bundle to respond to a provisioning request at block 411. In one embodiment, an error message may be forwarded to an authorization server, such as SA 101 of FIG. 3.

If a provisioning bundle is validated, the processing logic of process 400A may update a provisioning sequence number in a current configuration, such as PBSN_LAST 235 of FIG. 2, according to a bundle sequence number associated with the provisioning bundle at block 413. Thus, a configuration in a provisioning engine may keep track of the last (latest) bundle sequence number for valid provisioning bundles retrieved.

At block 415, according to one embodiment, the processing logic of process 400A determines if a provisioning engine is authorized to perform provisioning operations according to a current configuration of a provisioning engine, such as configuration 215 of FIG. 2. The processing logic of process 400A may compare two sequence numbers in a configuration. In one embodiment, the processing logic of process 400A determines that a provisioning engine is authorized or has enough credits to perform provisioning operations if a last receipt sequence number, such as RSN_LAST 237 of FIG. 2, is less than a maximum receipt sequence number, such as RSN_MAX 239 of FIG. 2, in a configuration. At block 417, if an authorization is determined, the processing logic of process 400A may generate a new receipt sequence number to update a last receipt sequence number in a configuration. In one embodiment, a last receipt sequence number may be updated by up counting by one.

In one embodiment, at block 419, the processing logic of process 400A generates provisioning data to provision a device according to a validated provisioning bundle and unique hardware identifiers in a provisioning request received. A provisioning data may include customization data, such as SIM Lock behavior definitions, extracted from a provisioning bundle selected from a provisioning queue. A SIM Lock behavior definition may apply to devices to satisfy a given carrier order. In one embodiment, the processing logic of process 400A randomly generates per unit secrets as personalization data in a provisioning data. The processing logic of process 400A may derive per unit secrets cryptographically from an IMEI of a selected provisioning bundle and a device hardware identifier (e.g. a device serial number). In some embodiments, per unit secrets are pre-generated in an authorization server in the form of a provisioning bundle with an encrypted payload. The processing logic of process 400A may combine personalization data and customization data into a single data structure as a provisioning data to deliver to a device for provisioning. The processing logic of process 400A may protect a provisioning data against forgery or inspection with a combination of field encryption and signatures based on a security key of a current configuration, such as SECK 229 of FIG. 2, according to, for example, a public key and/or symmetric cryptographic algorithms.

Subsequently at block 421, in one embodiment, the processing logic of process 400A generates a receipt including a receipt sequence number, a bundle sequence number, a profile identifier and/or secret provisioning codes. A receipt sequence number may be a last sequence number updated in a configuration, such as RSN_LAST 237 of FIG. 2. A bundle sequence number may be associated with the provisioning bundle retrieved at block 405. A profile identifier may be obtained from a provisioning request to select a provisioning queue at block 405. Additionally, a receipt may include unique device identifiers (e.g. a MAC address) and/or secret provisioning codes generated during provisioning operations, such as unlock codes. A secret such as an unlock code in a receipt may be encrypted. A receipt may include a date and date/time stamp on a received provisioning request. In one embodiment, a receipt is signed by an identity key, such as PE_ID 221 of FIG. 2, stored in a configuration according to, for example, a public key cryptographic algorithms. A receipt may also include a hash (e.g. based on SHA (Secure Hash Algorithm) version 1 algorithm) of a public part of an identity key.

At block 423, the processing logic of process 400A may send a generated provisioning data to a device. Subsequently, the processing logic of process 400A may receive a status from a device to indicate a result (e.g. success or failure) of provisioning the device at block 425. A status may include one or more unique device hardware identifiers, such as a unique serial number. At block 427, in one embodiment, the processing logic of process 400A sends an authorization server, such as AS 101 of FIG. 3, a receipt message including the generated receipt and the received status for device provisioning.

At block 429, if it is determined that a provisioning operation is not authorized, the processing logic of process 400A may generate a receipt including a receipt sequence number, a bundle sequence number and/or a profile identifier. A receipt may include a status indicating lack of authorization credit to perform provisioning. Similar to cryptographic operations performed at block 421, a receipt may be cryptographically signed by an identity key and include a hash of a public part of an identity key. In one embodiment, at block 431, the processing logic of process 400A sends an authorization server, such as SA 101 of FIG. 3, a receipt message including the generated receipt. The processing logic of process 400A may send the device requesting provisioning a notification message indicating a provisioning error at block 433. In one embodiment, the processing logic of process 400A sends a credit request to an anthorization server at block 435 as a result of detecting a lack of authorization credit for performing provisioning operations.

Figure 4B:
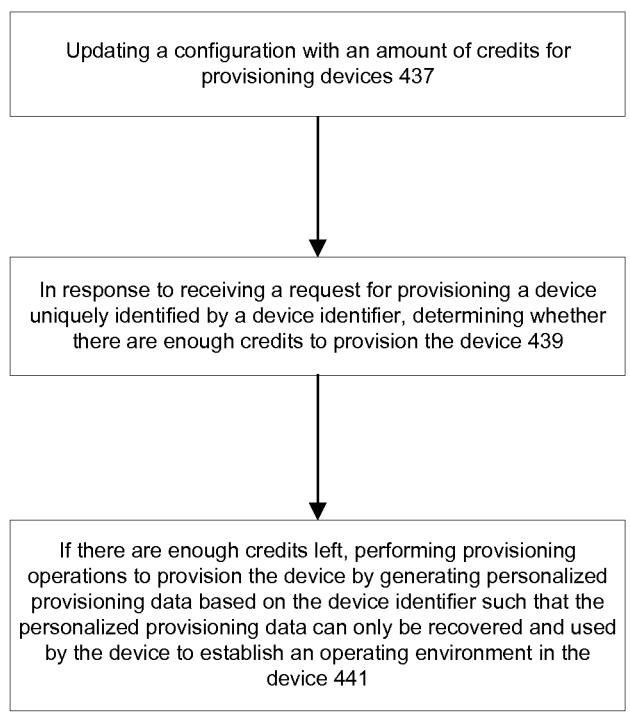

FIG. 4B is a flow diagram illustrating one embodiment of a process to provision secretes into a device. Exemplary process 400B may be performed by a processing logic that may include hardware (circuitry, dedicated logic, etc.), software (such as is run on a dedicated machine), or a combination of both. For example, process 400B may be performed by system 200 of FIG. 2. At block 437, according to one embodiment, the processing logic of process 400B updates a current configuration, such as configuration 215 of FIG. 2, with an amount of credits to perform provisioning operations for devices. An amount of credits for a configuration may be derived from one or more sequence numbers included in the configuration. In one embodiment, at block 437, the processing logic of process 400B may perform operations including similar operations according to the processing logic of process 400A at blocks 401 and/or 403 of FIG. 4A.

In response to receiving a request for provisioning a device uniquely identified by a device identifier, such as a unique device hardware identifier, at block 437, the processing logic of process 400B may determine whether there are enough credits left to provision a device, such as, for example, according to an amount of credits associated with a configuration. In one embodiment, at block 439, the processing logic of process 400' may perform operations including similar operations according to the processing logic of process 400A at blocks 407, 409, 413 and/or 405 of FIG. 4A.

If there are enough credits left, for example, in a current configuration, the processing logic of process 400B provisions a device at block 441. The processing logic of process 400B may generate personalized provisioning data based on a device identifier such that the personalized provisioning data can only be recovered and used by the device identified according to the device identifier. A device may require a provisioning data to establish an operating environment for the device. In one embodiment, at block 441, the processing logic of process 400B may perform operations including similar operations according to the processing logic of process 400A at blocks 417, 419, 421 and/or 423 of FIG. 4A.

At block 503, the processing logic of process 500a may determine a number of provisioning operations to authorize a provisioning engine to perform according to a maximum sequence number in an authorization request. In one embodiment, an authorization request includes a maximum receipt sequence number of a configuration in a provisioning engine, such as RSN_MAX 239 of FIG. 2. The processing logic of process 500a may query a receipt database, such as receipt database 119 of FIG. 3, for a latest receipt sequence number recorded. In one embodiment, the processing logic of process 500a determines a number of authorized provisioning operations (e.g. authorization credits) for a provisioning engine according to a maximum sequence number in an authorization request, a latest receipt sequence number queried, and a date/time stamp recorded corresponding to the latest receipt sequence number (e.g. based on a receipt). For example, if a maximum sequence number closely matches a latest receipt sequence number (e.g. differing by a predetermined difference amount), the processing logic of process 500a may generate a new maximum receipt sequence number by adding an amount of additional authorization credits to the maximum sequence number. In one embodiment, the amount of additional authorization credits may depend on a lapse of time since a date/time stamp included in the latest receipt. Alternatively, the amount of additional authorization credits may be predetermined.

According to one embodiment, at block 505, the processing logic of process 500a may send an authorization message including a new maximum receipt sequence number to a provisioning engine, for example, via a provisioning engine interface module 309 of FIG. 3. In some embodiments, an authorization message includes a profile identifier and/or a configuration sequence number, e.g. corresponding to CPSN number 233 of FIG. 2 in a provisioning engine. An authorization message may be cryptographically signed by an authorization key, such as authorization key 313 and/or a PE key 317 of FIG. 3, according to, for example, public key cryptographic algorithms. The processing logic of process 500a may attempt to establish network connection to send an authorization message (or packet) to a provisioning engine via an unsecured and intermittent network (e.g. established connections are randomly dropped without any guarantee of up time), such as network 121 of FIG. 1. In one embodiment, the processing logic of process 500a repetitively makes attempts to send the same copy of an authorization message periodically (e.g. based on fixed interval) for a predetermined period of time until the authorization is successfully sent (e.g. receiving a reply indicating successful receiving).

According to one embodiment, at block 507, the processing logic of process 500b may generate a batch of provisioning bundles associated with monotonically (e.g. consecutively) increasing provisioning bundle sequence numbers. Each provisioning bundle in a batch may be associated with a profile identifier according to vendor allocations to provision a category of devices, such as configurations for cell phones from a carrier. In one embodiment, a batch of provisioning bundles are cryptographically encrypted for a provisioning engine based on an encryption key, such as, for example, a public part of PE_EK key 223 of FIG. 2. At block 509, the processing logic of process 500b may send the batch of provisioning bundles to a provisioning engine associated with the identity key, for example, via a provisioning server, such as PS 105 of FIG. 1, corresponding to the provisioning engine, such as PE 103 of FIG. 1. In one embodiment, the processing logic of process 500b validates or authenticates a provisioning receipt received from a provisioning engine based on an identity key associated with the provisioning engine at block 511. A provisioning receipt may include a hash of an identity key, such as a PE key 317 of FIG. 3, for authentication according to cryptographic algorithms. If a receipt is successfully validated, at block 513, the processing logic of process 500b may retrieve a provisioning bundle sequence number, a device serial number (e.g. a device hardware chip identifier) and/or personalized provisioning data (e.g. unlock codes) from the receipt to be stored in one or more secure databases, such as receipt databases 119 of FIG. 3. In one embodiment, the processing logic of process 500b decrypts secrets, such as unlock codes, included in the personalized provisioning data. A personalized provisioning data, e.g. unlock codes, may be retrieved from a secure database for managing provisioned devices according to unique device serial numbers.

Figure 6:
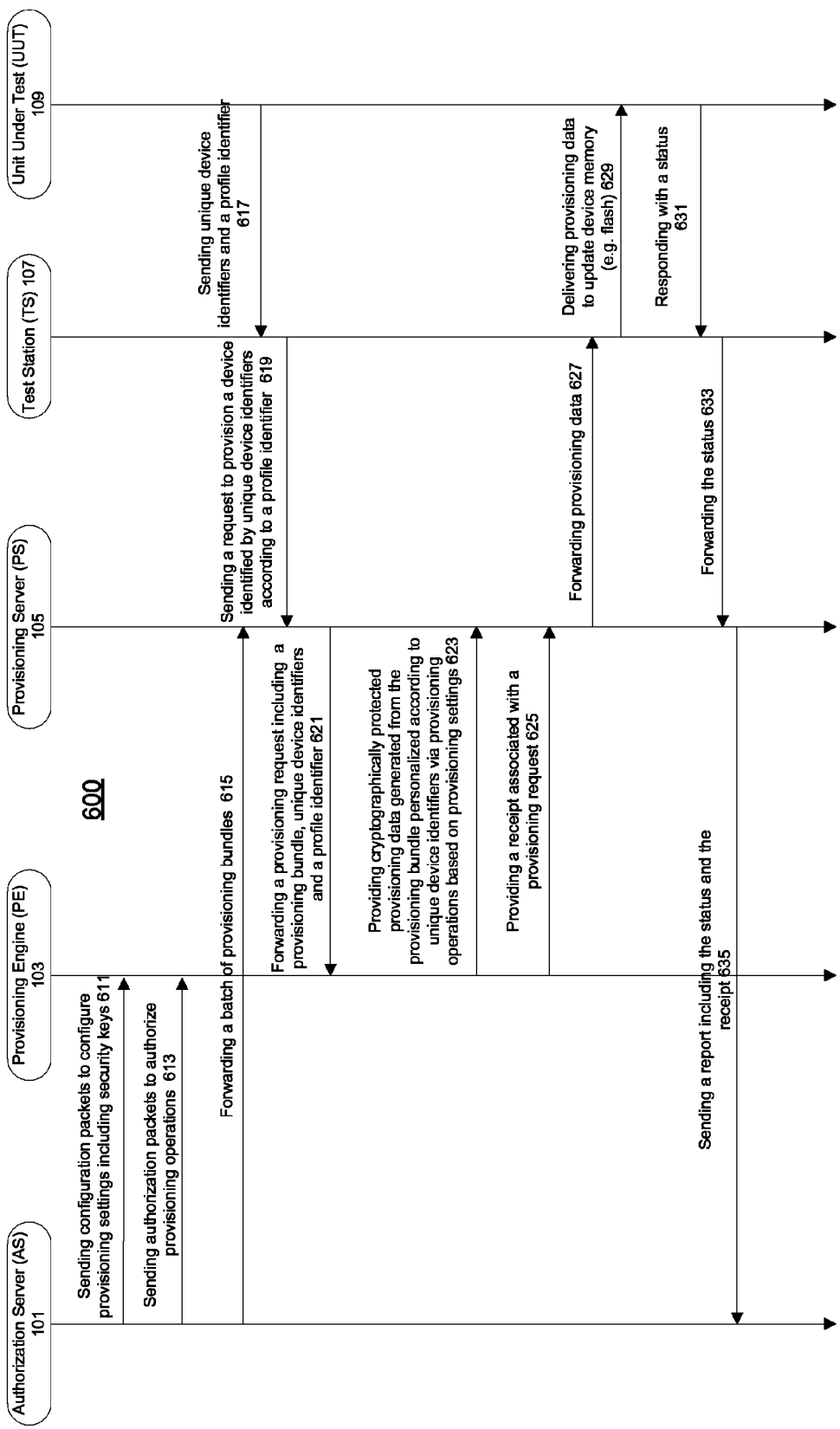
FIG. 6 is a sequence diagram illustrating exemplary transactions over unsecured networks for provisioning a device.

FIG. 6 is a sequence diagram illustrating exemplary transactions over unsecured networks for provisioning a device, such as, for example, via network 121 of FIG. 1. In one embodiment, at sequence 611, an authorization server 101 sends a configuration packet for configuration settings to a provisioning engine 103. Configuration settings may include cryptographic keys and/or sequence numbers such as in configuration 215 of FIG. 2. At sequence 613, an authorization server 101 may send authorization packets including authorization credits to authorize provisioning operations to a provisioning engine 103. Note that the configuration packet and the authorization packet may be bundled into a single packet in a single transaction (e.g. in combination of sequence 611 and sequence 613). In one embodiment, an authorization server 101 forwards a batch of provisioning bundles allocated for a provisioning engine 103 to a provisioning server 105 at sequence 615. A provisioning engine 103 may have a one to one relationship with a provisioning server 105. Alternatively, provisioning engine 103 may be associated with multiple provisioning servers. At sequence 617, in one embodiment, a unit under test 109 sends unique device identifiers, such as unique hardware identifiers, and/or a profile identifier to a test station 107, subsequent to, for example, the unit under test 109 being coupled to the test station 107. A test station 107 may send a request including unique device identifiers and a profile identifier received from a unit under test 109 to a provisioning server 105 at sequence 619.

In one embodiment, a provisioning server 105 composes a provisioning request including a provisioning bundle retrieved according to a profile identifier. A provisioning request for provisioning a device may include unique device identifiers and a profile identifier received from the device. At sequence 621, a provisioning server 105 forwards a provisioning request to a provisioning engine 103. In one embodiment in response to the provisioning request, a provisioning engine 103 provides cryptographically protected provisioning data to a provisioning server 105 at sequence 623. A provisioning data may include provisioning secrets generated from provisioning bundle personalized by unique device identifiers based on provisioning settings in a configuration, such as configuration 215 of FIG. 2. At sequence 625, a provisioning engine 103 may provide a receipt associated with a provisioning request to a provisioning server 105. A receipt may be cryptographically signed according to provisioning settings in a configuration. A provisioning server 105 may forward a provisioning data to a test station 107 at sequence 627. Subsequently, a test station 107 may deliver received provisioning data to provision a unit under test 109 at sequence 629. A device may be provisioned via an update of a flash memory with a provisioning data. At sequence 631, a unit under test 109 may respond to a test station 107 a provisioning status indicating a result of a provisioning. In turn, a test station 107 may forward a provisioning status to a provisioning server 105 at sequence 633. A provisioning server 105 may combine a provisioning status with a corresponding receipt into a message to send to an authorization server 101 at sequence 635.

Figure 7:
FIG. 7 is a block diagram illustrating an example of a data structure for a provisioning data.

FIG. 7 is a block diagram illustrating an example of a data structure for a provisioning data, such as, for example, provisioning data 125 of FIG. 2. Data structure 700 may include personalization data and customization data generated from a provisioning bundle, such as, for example, retrieved from a provisioning bundle queue 111 of FIG. 2. In one embodiment, an encrypted IMEI field 703 stores an encrypted unique IMEI number provided via a provisioning bundle. A signature field 701 may store a signature corresponding to an IMEI number. A Simlock data field 707 may include SIM lock data generated during provisioning operations on the fly to personalize data from a provisioning bundle uniquely for a device. A SIM lock signature field 705 may store a signature signed over SIM lock data. Encryptions and signatures within fields of data structure 700 may be based cryptographic keys in a configuration, such as SECK key 229 of FIG. 2.

Figure 8:
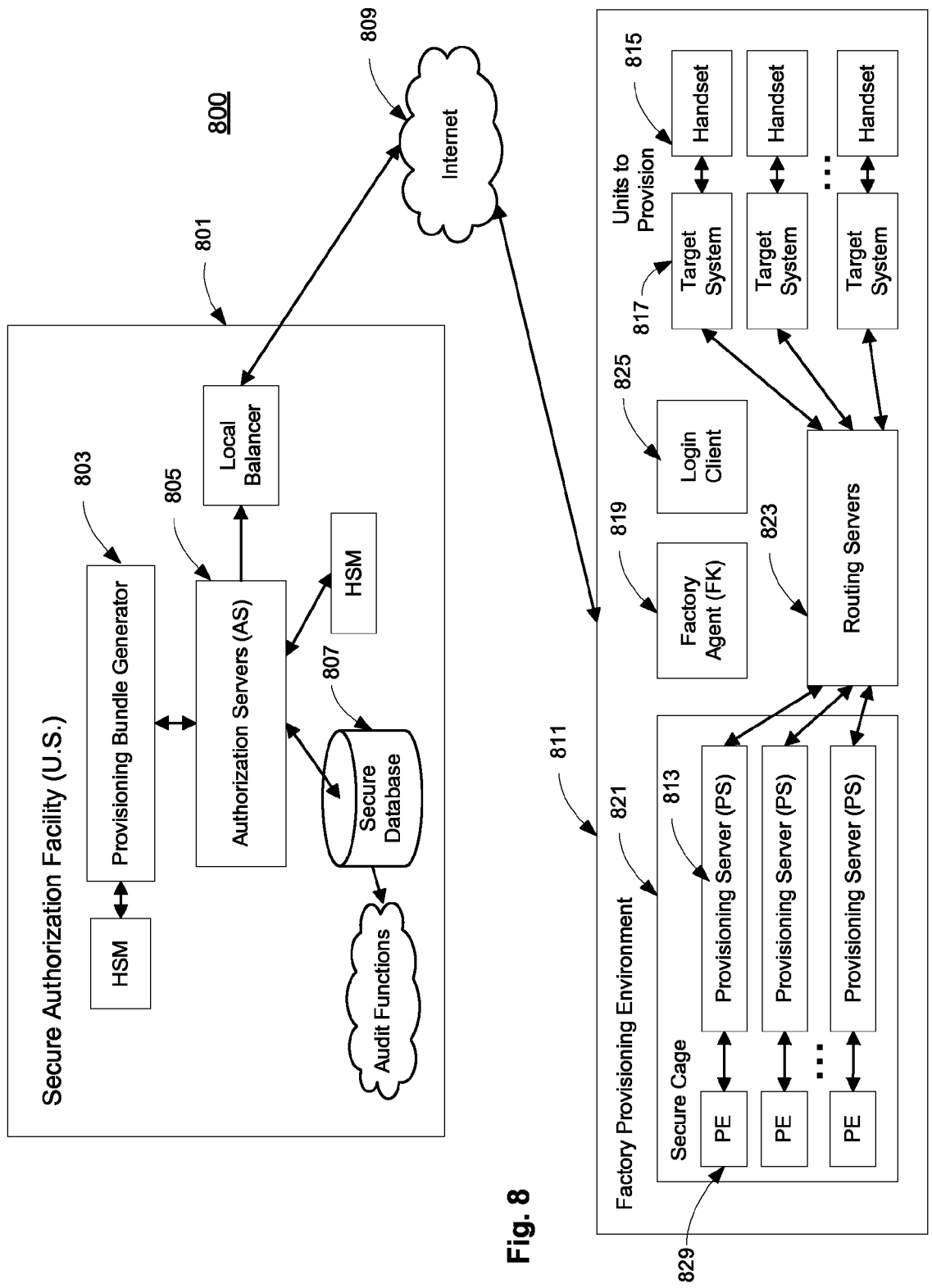
FIG. 8 is a block diagram illustrating an example of networked configurations to perform provisioning operations.

FIG. 8 is a block diagram illustrating an example of networked configurations to perform provisioning operations. Configuration 800 may be a typical infrastructure required to support the high volume production required in factories. Per unit secrets may be built in a secure authorization facility and stored on authorization servers 805 for remote on-demand delivery to factory-hosted provisioning servers 813. A provisioning server 813 may be permitted to keep a number of per-unit provisioning bundles on hand to mitigate the effects of network outage. Load balancing, redundancy, and scalability may be standard features of a provisioning architecture 800 in support of high-volume production.

Security of secrets within a factory 811 may be achieved by encrypting each provisioning bundle to a specific provisioning engine (PE) 829 mated to each provisioning server (PS) 813. After decryption of a given provisioning bundle, the PE 829 may prepare the target SEC Data Structure within its secure boundary by requesting the hardware details from the handset 815 to provision and binding the personalization and customization data to the target with signatures and symmetric encryption. The logical functions of the provisioning servers 813 and the routing servers 823 facilitate end-to-end communication between the PE's 829 and target systems 817, but never have access to the plain-text secrets.

The actual PE instance can take on one of several forms and is often coupled with a measure of physical security (a secure cage, for example) 821. The degree of physical security required depends on the form of the PE 829. Deployments of factory provisioning may be based on a software PE process instantiated on a provisioning server that is physically locked and guarded in a secure environment. Some example PE instances may include:

- Software process running on the PS
- Smartcard, iButton, or other discrete programmable personal security token
- Multi-session programmable HSM (Hardware Security Module) (i.e., nCipher type products)

To reduce network dependency, an individual PE 829 can perform a limited number of authorizations before requiring connection to the home network's authorization servers 805 for "topping off" and secure reporting of audit logs. The general "topping off" algorithm may restore one licensing credit to the PE for each end-unit provisioning receipt provided by the PE. The receipts, in turn, may allow periodic audits to ensure that the number of revenue-producing handsets shipped by a given factory matches the number of individual licenses served. Mechanisms are in place to deal with exceptions such as lost receipts, re-provisioned handsets, etc. A mismatch in shipped quantities and license quantities indicates possible theft of licenses (e.g., by late night unauthorized use of a factory line).

In one embodiment, a secure authorization facility 801 includes a secure authorization center 117 of FIG. 1. A secure authorization facility 801 may be located within U.S. in consideration of import/export compliance. A provisioning bundle generator 803 may include a provisioning bundle generator module 305 of FIG. 3. In one embodiment, authorization servers 805 include one or more authorization servers, such as AS 101 of FIG. 1. A secure database 807 may be a receipt database 119 of FIG. 1. Internet 809 may be unsecured and intermittent, such as network 121 of FIG. 1. In one embodiment, factory provisioning environment 811 includes an unsecured factory area 115 of FIG. 1. A server unit 813 within a secured cage 821 may include a provisioning server and a provisioning engine, such as PE 103 and PS 105 of FIG. 1. A test PC 817 may be a test station 107 of FIG. 1. M68 815 may be a device to be provisioned, such as UUT 109 of FIG. 1. In one embodiment, routing servers 823 provides load balance across provisioning engines. Additionally, routing servers 823 work with a login client 825 to implement per line and master on/off switches. A factory key 819 associated with usage passwords may protect routing servers 823. Selected distribution of factory key usage passwords may allow for a trail of accountability for audits.

Figure 9:
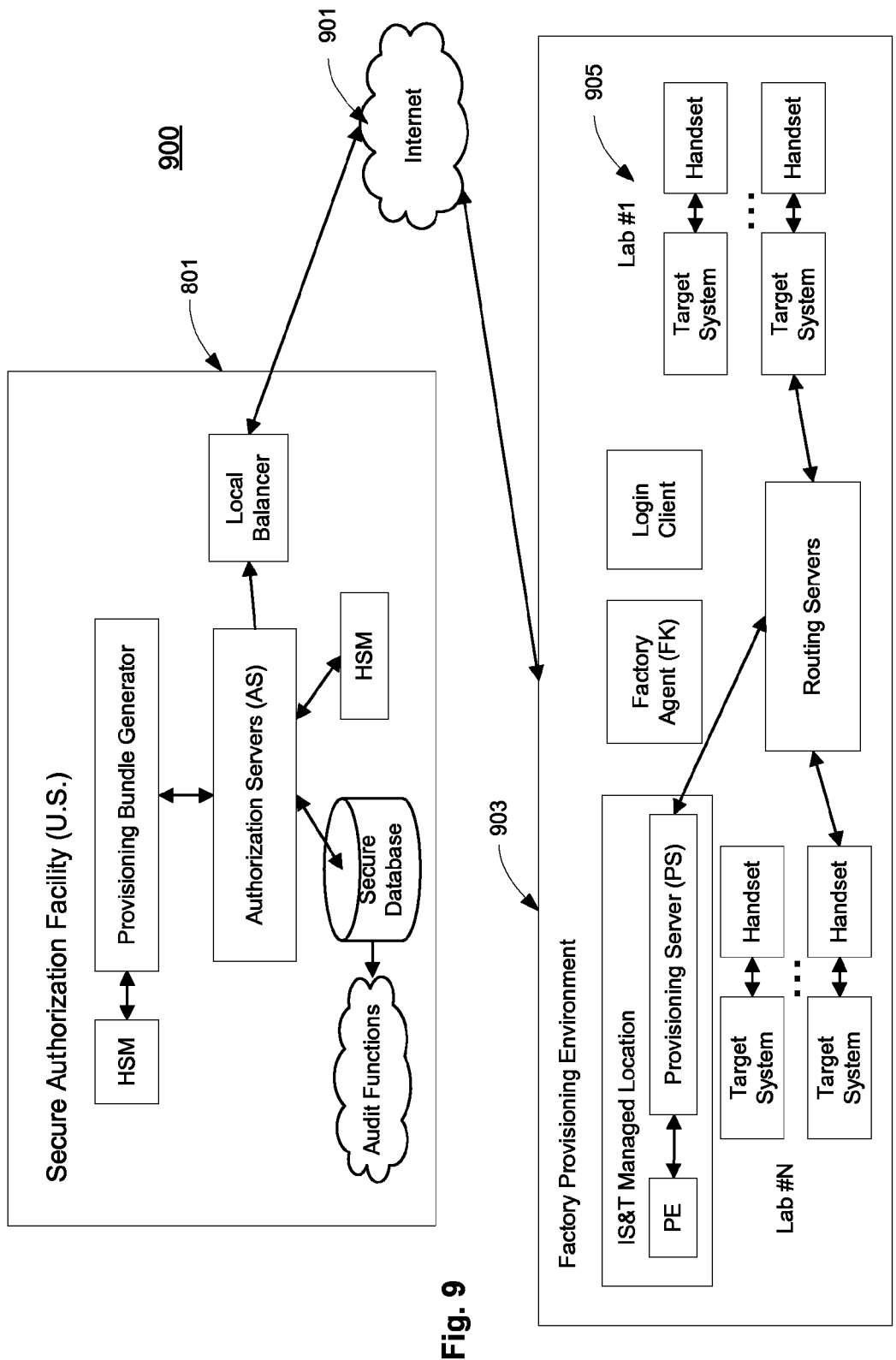
FIG. 9 is a block diagram illustrating an alternative example of networked configurations to perform provisioning operations.

FIG. 9 is a block diagram illustrating an alternative example of networked configurations to perform provisioning operations. In one embodiment, network 901 is a secured network with guaranteed reliability. A campus provisioning environment 903 may support low volume production required for prototype builds. A campus lab 905 may be a virtual factory line. Different management policies may be allowed on per lab basis. An individual lab 905 may be awarded a small but sufficient number of licenses (e.g. authorization credits) for a given build. Automatic time out settings to lines (e.g. based on provisioning engine settings for heart beat messages) may be relatively generous, for example, lasting for weeks at a time.

Figure 10:
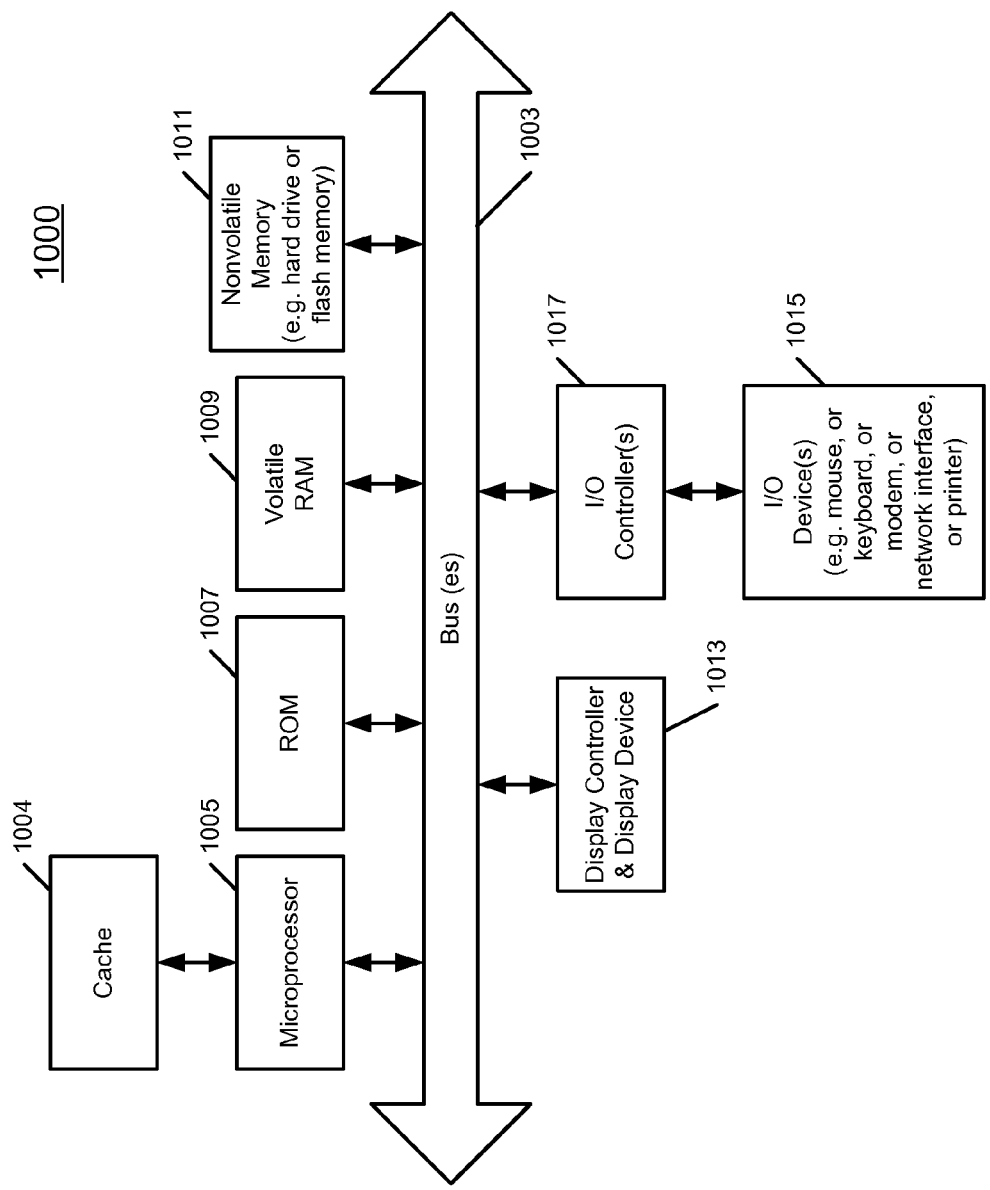
FIG. 10 illustrates one example of a typical computer system which may be used in conjunction with the embodiments described herein.

FIG. 10 shows one example of a data processing system which may be used with one embodiment the present invention. For example, the system 1000 may be implemented including a host as shown in FIG. 5. Note that while FIG. 10 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention.

As shown in FIG. 10, the computer system 1000, which is a form of a data processing system, includes a bus 1003 which is coupled to a microprocessor(s) 1005 and a ROM (Read Only Memory) 1007 and volatile RAM 1009 and a non-volatile memory 1011. The microprocessor 1005 may retrieve the instructions from the memories 1007, 1009, 1011 and execute the instructions to perform operations described above. The bus 1003 interconnects these various components together and also interconnects these components 1005, 1007, 1009, and 1011 to a display controller and display device 1013 and to peripheral devices such as input/output (I/O) devices which may be mice, keyboards, modems, network interfaces, printers and other devices which are well known in the art. Typically, the input/output devices 1015 are coupled to the system through input/output controllers 1017. The volatile RAM (Random Access Memory) 1009 is typically implemented as dynamic RAM (DRAM) which requires power continually in order to refresh or maintain the data in the memory.

The mass storage 1011 is typically a magnetic hard drive or a magnetic optical drive or an optical drive or a DVD RAM or a flash memory or other types of memory systems which maintain data (e.g. large amounts of data) even after power is removed from the system. Typically, the mass storage 1011 will also be a random access memory although this is not required. While FIG. 10 shows that the mass storage 1011 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 1003 may include one or more buses connected to each other through various bridges, controllers and/or adapters as is well known in the art.

Figure 11:
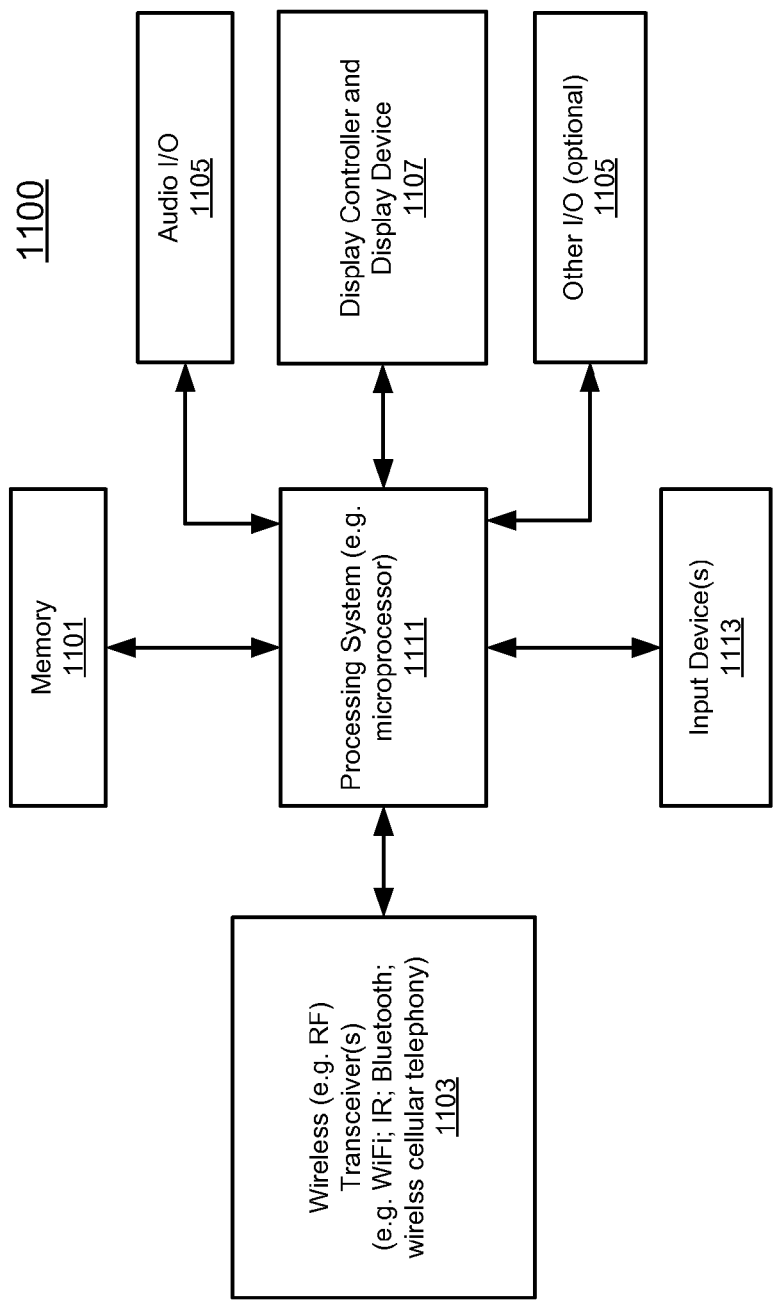
FIG. 11 shows an example of another data processing system which may be used with one embodiment of the present invention.

FIG. 11 shows an example of another data processing system which may be used with one embodiment of the present invention. For example, system 1100 may be implemented as part of system as shown in FIG. 1. The data processing system 1100 shown in FIG. 11 includes a processing system 1111, which may be one or more microprocessors, or which may be a system on a chip integrated circuit, and the system also includes memory 1101 for storing data and programs for execution by the processing system. The system 1100 also includes an audio input/output subsystem 1105 which may include a microphone and a speaker for, for example, playing back music or providing telephone functionality through the speaker and microphone.

A display controller and display device 1107 provide a visual user interface for the user; this digital interface may include a graphical user interface which is similar to that shown on a Macintosh computer when running OS X operating system software. The system 100 also includes one or more wireless transceivers 1103 to communicate with another data processing system, such as the system 1100 of FIG. 11. A wireless transceiver may be a WiFi transceiver, an infrared transceiver, a Bluetooth transceiver, and/or a wireless cellular telephony transceiver. It will be appreciated that additional components, not shown, may also be part of the system 1100 in certain embodiments, and in certain embodiments fewer components than shown in FIG. 11 may also be used in a data processing system.

The data processing system 1100 also includes one or more input devices 1113 which are provided to allow a user to provide input to the system. These input devices may be a keypad or a keyboard or a touch panel or a multi touch panel. The data processing system 1100 also includes an optional input/output device 1115 which may be a connector for a dock. It will be appreciated that one or more buses, not shown, may be used to interconnect the various components as is well known in the art. The data processing system shown in FIG. 11 may be a handheld computer or a personal digital assistant (PDA), or a cellular telephone with PDA like functionality, or a handheld computer which includes a cellular telephone, or a media player, such as an iPod, or devices which combine aspects or functions of these devices, such as a media player combined with a PDA and a cellular telephone in one device. In other embodiments, the data processing system 1100 may be a network computer or an embedded processing device within another device, or other types of data processing systems which have fewer components or perhaps more components than that shown in FIG. 11.

At least certain embodiments of the inventions may be part of a digital media player, such as a portable music and/or video media player, which may include a media processing system to present the media, a storage device to store the media and may further include a radio frequency (RF) transceiver (e.g., an RF transceiver for a cellular telephone) coupled with an antenna system and the media processing system. In certain embodiments, media stored on a remote storage device may be transmitted to the media player through the RE transceiver. The media may be, for example, one or more of music or other audio, still pictures, or motion pictures.

The portable media player may include a media selection device, such as a click wheel input device on an iPod® or iPod Nano® media player from Apple Computer, Inc. of Cupertino, Calif., a touch screen input device, pushbutton device, movable pointing input device or other input device. The media selection device may be used to select the media stored on the storage device and/or the remote storage device. The portable media player may, in at least certain embodiments, include a display device which is coupled to the media processing system to display titles or other indicators of media being selected through the input device and being presented, either through a speaker or earphone(s), or on the display device, or on both display device and a speaker or earphone (s). Examples of a portable media player are described in published U.S. patent application numbers 2003/0095096 and 2004/0224638, both of which are incorporated herein by reference.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example a machine readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A computer implemented method, comprising:
updating, at a computer, a maximum sequence number in a configuration, the maximum sequence number updated to indicate credits for an additional number of provisioning operations authorized in the computer, wherein the maximum sequence number is updated increasingly in value to indicate the additional number of provisioning operations, each provisioning operation to generate provisioning data for provisioning a device;
in response to receiving a provisioning request to provision the device with provisioning data, validating the provisioning data based on the configuration;
determining, by the computer, whether enough of the credits are left for an authorization of a provisioning operation via the maximum sequence number, wherein there is lack of credit for the authorization if the additional number of provisioning operations have been performed by the computer; and
performing, by the computer, the provisioning operation to provision the device if the provisioning operation is authorized based on the credits left, wherein the provisioning data for the provisioning request is validated, the provisioning operation to generate personalized provisioning data for the device, and the personalized provisioning data is used specifically to provision the device.

2. The method of claim 1, wherein validating the provisioning data comprises:
validating a provisioning bundle based on a relationship between the configuration and a bundle sequence number identifying the provisioning bundle; and
if the provisioning bundle is validated, determining an authorization for the provisioning request.

3. The method of claim 2, further comprising:
selecting the provisioning bundle from a plurality of provisioning bundles associated with a plurality of bundle sequence numbers, wherein each provisioning bundle of the plurality of provisioning bundles corresponds to one bundle sequence number of the plurality of bundle sequence numbers, and the bundle sequence number has a minimum value among the plurality of bundle sequence numbers.

4. The method of claim 2, wherein the configuration includes a decryption key and a bundle sequence configuration number, and validating the provisioning bundle comprises:
   decrypting the provisioning bundle according to the decryption key;
   determining if the bundle sequence number and the bundle sequence configuration number satisfy a relationship; and
   updating the bundle sequence configuration number in the configuration according to the bundle sequence number if the relationship is determined to be satisfactory.

5. The method of claim 4, wherein the provisioning bundle includes one or more pre-assigned unique identifiers including a device system identifier and a network address.

6. The method of claim 5, wherein the configuration includes a security key, the provisioning data includes a unique unlock code, the device system identifier and the network address, and the generation of the provisioning data comprises:
   generating cryptographically the unique unlock code according to at least one of the one or more pre-assigned unique identifiers and the device hardware identifier; and
   signing cryptographically the provisioning data according to the security key.

7. The method of claim 6, wherein the configuration includes a configuration key, and the method further comprises:
   in response to receiving a configuration packet including a set of keys, validating cryptographically the configuration packet according to the configuration key; and
   updating the configuration to replace the security key with one of the set of keys.

8. The method of claim 7, wherein the configuration includes a configuration sequence number, the configuration packet includes a configuration packet sequence number, and the validation of the configuration packet further comprises:
   comparing the configuration sequence number with the configuration packet sequence number, wherein the configuration packet is invalid if the configuration packet sequence number is no greater than the bundle sequence configuration number; and
   updating the configuration sequence number according to the bundle sequence configuration number if the configuration packet is validated.

9. The method of claim 2, wherein the provisioning request includes a type of the device, further comprising:
   determining one of a plurality of bundle queues according to the type of the device, wherein each bundle queue includes one or more provisioning bundles stored according to a serialized order among associated bundle sequence numbers; and
   selecting the provisioning bundle from the determined bundle queue based on the serialized order.

10. The method of claim 1, wherein the configuration includes a last sequence number, and the determination for the authorization of the provisioning operation comprises:
    comparing the last sequence number with the maximum sequence number, wherein the provisioning operation is authorized if the last sequence number is smaller than the maximum sequence number; and
    updating the last sequence number according to the comparison.

11. The method of claim 10, wherein the update increases the value of the last sequence number.

12. The method of claim 10, wherein the configuration includes an identity key, further comprising:
    receiving a status including the device hardware identifier from the device provisioned by the provisioning data;
    generating a receipt including the unlock code, the provisioning bundle sequence number, the status and the updated last sequence number; and
    signing cryptographically the receipt according to the identity key.

13. The method of claim 12, further comprising:
    if the provisioning operation is not authorized, generating an authorization request including the maximum sequence number; and
    signing the authorization request according to the identity key; and
    sending the encrypted authorization request to an authorization server.

14. The method of claim 13, wherein the configuration includes an authorization key, and the method further comprises:
    in response to receiving an authorization packet including an authorization number indicating the maximum number of provisioning operations allowed, validating cryptographically the authorization packet according to the authorization key; and
    updating the maximum sequence number according to the authorization number.

15. A computer implemented method, comprising:
    in response to receiving an authorization request for a number of provisioning operations to provision devices from a provisioning engine, validating the authorization request using an identity key uniquely associated with the provisioning engine, each provisioning operation to generate provisioning data for provisioning a single device, wherein the authorization request includes a maximum sequence number indicating a maximum number of provisioning operations allowed in the provisioning engine;
    if the authorization request is validated, determining if the provisioning engine has performed the maximum number of provisioning operations;
    if the provisioning engine has performed the maximum number of provisioning operations, generating a sequence number indicating an authorized number of provisioning operations allowed for the provisioning engine in addition to the maximum number of provisioning operations, the sequence number being greater than the maximum sequence number; and
    sending the provisioning engine an authorization packet including the sequence number cryptographically signed using an authorization key, wherein the provisioning engine is limited to perform no more than the authorized number of provisioning operations in addition to the maximum number of provisioning operations.

16. The method of claim 15, wherein the authorized number of provisioning operations is determined according to an increase of a fixed amount over the maximum sequence number.

17. The method of claim 15, wherein the sending the authorization packet comprises contacting the provisioning engine to establish a network connection and forwarding the authorization packet over the network connection to receive a response, and the contact is performed periodically over a predetermined period of time until the response is successful.

18. The method of claim 15, further comprising:
generating a batch of provisioning bundles encrypted for the provisioning engine uniquely associated with an identity key, the batch being associated with a monotonically increasing provisioning bundle sequence numbers, the batch including a provisioning bundle having a device system identifier; and
sending the provisioning engine the batch of provisioning bundles including the associated provisioning bundle sequence numbers.

19. The method of claim 18, further comprising:
in response to receiving a provisioning receipt from the provisioning engine, validating cryptographically the provisioning receipt according to the identity key; and
retrieving from the provisioning receipt a device hardware identifier and the device system identifier; and
storing the device hardware identifier associated with the device system identifier in one or more secure databases.

20. A non-transitory computer-readable storage medium storing instructions that, when executed by a processor included in a computer, cause the computer to perform steps that include:
updating, at the computer, a maximum sequence number in a configuration, the maximum sequence number updated to indicate credits for an additional number of provisioning operations authorized for the computer, wherein the maximum sequence number is updated increasingly in value to indicate the additional number of provisioning operations, each provisioning operation to generate provisioning data for provisioning a single device;
in response to receiving a provisioning request to provision a device with provisioning data, validating the provisioning data based on the configuration;
determining, by the computer, whether enough of the credits are left for an authorization of a provisioning operation via the maximum sequence number, wherein there is lack of credits for the authorization if the additional number of provisioning operations have been performed by the computer; and
performing, by the computer, the provisioning operation to provision the device if the provisioning operation is authorized based on the credits left, wherein the provisioning data for the provisioning request is validated, the provisioning operation to generate personalized provisioning data for the device, and the personalized provisioning data is used specifically to provision the device.

21. A non-transitory computer-readable storage medium storing instructions that, when executed by a processor included in a computer, cause the computer to perform steps that include:
in response to receiving an authorization request for a number of provisioning operations to provision devices from a provisioning engine, validating the authorization request using an identity key uniquely associated with the provisioning engine, each provisioning operation to generate provisioning data for provisioning a single device, wherein the authorization request includes a maximum sequence number indicating a maximum number of provisioning operations allowed by the provisioning engine;
if the authorization request is validated, determining if the provisioning engine has performed the maximum number of provisioning operations;
if the provisioning engine has performed the maximum number of provisioning operations, generating a sequence number indicating an authorized number of provisioning operations allowed for the provisioning engine in addition to the maximum number of provisioning operations, the sequence number being greater than the maximum sequence number; and
sending the provisioning engine an authorization packet including the sequence number cryptographically signed using an authorization key, wherein the provisioning engine is limited to perform no more than the authorized number of provisioning operations in addition to the maximum number of provisioning operations.

22. A data processing system, comprising:
a memory unit including instructions and a configuration; and
a processing unit coupled to the memory unit through a bus to execute the instructions, wherein the instructions include:
a configuration software module being configured to update a maximum sequence number in the configuration, the maximum sequence number updated to indicate credits for an additional number of provisioning operations authorized, wherein the maximum sequence number is updated increasingly to indicate the additional number of provisioning operations, each provisioning operation to generate provisioning data for provisioning a single device,
an authorization software module being configured to, in response to receiving a provisioning request to provision a device with provisioning data, validate the provisioning data based on the configuration, and
determine whether enough of the credits are left for an authorization of a provisioning operation via the maximum sequence number, wherein there is lack of credit for the authorization if the additional number of provisioning operations have been performed, and
a provisioning software module being configured to perform the provisioning operation to provision the device if the provisioning operation is authorized based on the credits left, wherein the provisioning data for the provisioning request is validated by the authorization module, the provisioning operation to generate personalized provisioning data for the device, and the personalized provisioning data is used specifically to provision the device.

23. A data processing system, comprising:
a memory unit including instructions; and
a processing unit coupled to the memory unit through a bus to execute the instructions, wherein the instructions include:
an authorization software handler module configured to validate an authorization request in response to receiving the authorization request for a number of provisioning operations to provision devices from a provisioning engine according to an identity key uniquely associated with the provisioning engine, each provisioning operation to generate provisioning data for provisioning a single device, wherein the authorization request includes a maximum sequence number indicating a maximum number of provisioning operations allowed by the provisioning engine, and
determine, if the authorization request is validated, if the provisioning engine has performed the maximum number of provisioning operations,
generate, if the provisioning engine has performed the maximum number of provisioning operations, a sequence number indicating an authorized number of provisioning operations allowed for the provisioning engine in addition to the maximum number of provisioning operations, the sequence number being greater than the maximum sequence number, and a provisioning engine interface software module configured to send the provisioning engine an authorization packet including the sequence number cryptographically signed using an authorization key, wherein the provisioning engine is limited to perform no more than the authorized number of provisioning operations in addition to the maximum number of provisioning operations.

24. A computer implemented method, comprising:

updating, in a computer, a maximum sequence number in a configuration, the maximum sequence number updated to indicate indicating a maximum number of provisioning operations allowed by the computer, each provisioning operation to generate provisioning data for provisioning a single device; in response to a request for provisioning a device uniquely identified by a device identifier, determining, by the computer, whether there are enough credits to provision the device, wherein there are not enough credits available if the maximum number of provisioning operations have been performed by the computer; updating the maximum sequence number for additional credits to provision the device by the computer if there are not enough credits available, wherein the maximum sequence number is updated increasingly in value to indicate the additional credits; and performing, by the computer, a provisioning operation to provision the device if enough credits are available, the provisioning operation to generate personalized provisioning data based on the device identifier, wherein the personalized provisioning data can only be recovered and used by the device in order to provision the device in an attempt to establish an operating environment for the device.

* * * * *

UNITED STATES PATENT AND TRADEMARK OFFICE
CERTIFICATE OF CORRECTION

PATENT NO. : 8,752,165 B2
APPLICATION NO. : 12/202203
DATED : June 10, 2014
INVENTOR(S) : Hauck et al.

Page 1 of 1

It is certified that error appears in the above-identified patent and that said Letters Patent is hereby corrected as shown below:

In the Claims

Column 23, Claim 24, line 20: "indicate indicating a maximum" should read --indicate a maximum--.

Signed and Sealed this
Twenty-sixth Day of August, 2014

Michelle K. Lee
*Deputy Director of the United States Patent and Trademark Office*